United States Patent [19]

Newallis et al.

[11] Patent Number: 5,464,600
[45] Date of Patent: Nov. 7, 1995

[54] AMINE CATALYZED REACTION IN THE PRODUCTION OF THIOPHOSPHORYL CHLORIDE

[75] Inventors: Peter E. Newallis; Vidyanatha A. Prasad, both of LeaWood, Kans.; Jacqueline M. Applegate, Parkville, Mo.

[73] Assignee: Bayer Corporation, Pittsburgh, Pa.

[21] Appl. No.: 364,351

[22] Filed: Dec. 27, 1994

[51] Int. Cl.$^6$ .................................................... C01B 25/10
[52] U.S. Cl. ........................................................ 423/300
[58] Field of Search ............................................ 423/300

[56] References Cited

U.S. PATENT DOCUMENTS

| | | | |
|---|---|---|---|
| 2,547,158 | 4/1951 | Godfrey | 423/300 |
| 2,715,561 | 8/1955 | Knotz | 423/300 |
| 2,802,717 | 8/1957 | Edwards et al. | 423/300 |
| 2,850,353 | 9/1958 | Korkmas et al. | 423/300 |
| 2,850,354 | 9/1958 | Korkmas et al. | 423/300 |
| 2,911,281 | 11/1959 | Dimond et al. | 423/300 |
| 2,915,361 | 12/1959 | Knotz | 423/300 |
| 3,059,992 | 10/1962 | Brautigam et al. | 423/300 |
| 3,061,405 | 10/1962 | Olah et al. | 423/300 |
| 3,582,293 | 6/1971 | Odenweller | 423/300 |

FOREIGN PATENT DOCUMENTS

| | | | |
|---|---|---|---|
| 643339 | 6/1962 | Canada | 423/300 |
| 499650 | 8/1992 | European Pat. Off. | 423/300 |
| 1145589 | 3/1963 | Germany . | |
| 2032832 | 2/1971 | Germany | 423/300 |
| 116295 | 10/1978 | Japan | 423/300 |
| 147583 | 10/1961 | U.S.S.R. . | |
| 694380 | 7/1953 | United Kingdom . | |

*Primary Examiner*—Wayne Langel
*Attorney, Agent, or Firm*—Joseph C. Gil; Godfried R. Akorli

[57] ABSTRACT

Disclosed herein is an improved process for preparing a thiophosphoryl chloride comprising reacting sulfur with a phosphorous trichloride, the improvement comprising a catalytic amount of a tertiary amine catalyst.

15 Claims, No Drawings

AMINE CATALYZED REACTION IN THE PRODUCTION OF THIOPHOSPHORYL CHLORIDE

BACKGROUND OF THE INVENTION

1. Field of the Invention

The present invention relates to an improved process for the preparation of thiophosphoryl chloride that is useful as an intermediate for the synthesis of insecticidally active compounds.

2. Brief Description of the Prior Art

Disclosed by the prior art is a process for preparing thiophosphoryl chloride. British Patent 694,380 discloses the preparation of thiophosphoryl chloride by refluxing phosphorous trichloride and excess sulfur at atmospheric pressure, in the presence of carbon (activated with $K_2S$) and about 40 mole percent of thiophosphoryl chloride for about three hours. German Patent 1,145,589 discloses that $PSCl_3$ is obtained by treating phosphorous trichloride and sulfur in liquid phase at atmospheric pressure, using Al or alloys thereof, preferably aluminum wastes, as catalyst. $PSCl_3$ is preferably used as reaction medium and moderator. USSR 147,583 discloses that thiophosphoryl chloride is obtained from molten sulfur and phosphorous trichloride at 124°–126° C. and atmospheric pressure.

DESCRIPTION OF THE INVENTION

The present invention now provides an improved process for preparing thiophosphoryl chloride by reacting phosphorous trichloride with sulfur in the presence of a catalyst. The improvement comprises the catalyst which is a tertiary amine.

The process of the invention has the following advantages over the known methods for the preparation of thiophosphoryl chloride. It requires easily accessible starting materials, which can be reacted in an easily regulated one-pot process, to give high yields of the desired products. The thiophosphoryl chloride obtainable in accordance with the process can be isolated from the reaction mixture by simple operations, such as distillation.

By the process of the invention, one avoids disposal problems that are associated with the use of carbon catalysts. The by-product such as phosphorous oxychloride can be removed easily and the catalysts can be recycled repeatedly. Hence, it is not necessary to discharge the catalysts from the reaction vessel after they have been used.

The catalysts that are useful herein are base catalysts which are tertiary amines. Typically, the amines can be selected from the group consisting of pyridines which are typically substituted pyridines such as 5-ethyl-2-methylpyridine, 2-methylpyridine, 2,4-dimethylpyridine, 2,6-dimethylpyridine(lutidine), and 2,4,6-trimethylpyridine; trialkylamines such as tri-n-propylamine, and tri-n-butylamine. Preferred among the above catalysts are 5-ethyl-2-methylpyridine and tri-n-butylamine. Other tertiary amines useful herein can be N,N-dimethylaniline, 1,8-diazabicyclo[5.4.0]-undec-7-ene, and tris[2-(2-methoxyethoxy)ethyl]amine.

In the process of the invention, the phosphorous trichloride and sulfur can be employed in a ratio of sulfur to phosphorous trichloride that is in the range of about 1.5 to 1.1.

The reaction can be conducted at initial temperatures of about 110° C. to 140° C. and preferably 115° C. to 120° C.

The reaction product containing thiophosphoryl chloride is typically subjected to distillation to remove the thiophosphoryl chloride. After the isolation of the thiophosphoryl chloride and phosphorous oxychloride by-product, the distillation heel which contains the catalyst, can be recycled for reaction of phosphorous trichloride and sulfur.

In accordance with the invention, the process is well suited to a batch or continuous reaction. In the continuous reaction, the distillation heel is recycled continuously to a primary reactor stage, where the sulfur and phosphorous trichloride are reacted.

As can be seen from the foregoing, the process of the invention can be characterized by the advantage of using a tertiary amine catalyst which can produce a fluid heel on distillation of the reaction mixture. Preferably, the heel is fluid at ambient temperatures. The thiophosphoryl chloride prepared by the process according to the invention may be used as an intermediate for the synthesis of insecticidal thiophosphoric acid esters.

The invention is further illustrated but is not intended to be limited by the following examples in which all parts and percentages are by weight unless otherwise specified.

EXAMPLES

Example 1

Synthesis of thiophosphoryl chloride via the reaction of phosphorous trichloride and sulfur as follows.

| Charges | Catalyzed by 5-ethyl-2-methylpyridine: | | | |
|---|---|---|---|---|
| | F. Wt. | Al % | Moles | Quantity |
| $PCl_3$ | 137.53 | 98 | (1.01) | 140.1 g |
| Sulfur | 32.06 | 100 | (1.4 ) | 44.9 g |
| 5-ethyl-2-methylpyridine | 121.18 | 98 | (0.16) | 20.0 g |

Procedure

To a 500 ml 4-necked round bottomed flask (fitted with a mechanical stirrer, thermometer, Friedrich condenser cooled to (−10° C.) and nitrogen blanket adaptor and Erlenmeyer flask containing 5% sodium hydroxide through which gases are bubbled) was charged the sulfur and the $PCl_3$ and then the 5-ethyl-2-methylpyridine was charged with a resulting slight exotherm. The reaction temperature was gradually raised to 120° C. and the mixture was cooked at this temperature for 9 hours. The reaction was monitored by a Hewlett Packard Model 5890 gas chromatograph.

The reaction mixture was subjected to an atmospheric distillation. The thiophosphoryl chloride was collected over a temperature range of 113°–118° C. The heel residue comprising thiophosphoryl and 5-ethyl-2methylpyridine was saved for the next batch. The distilled product analyzed 98.1% active ingredient and contained 1.8% phosphorous oxychloride as the main impurity.

Remaining in the flask, after the distillation is the distillation heel containing the 5-ethyl-2-methylpyridine that can be used in subsequent batches. The process was repeated over 10 cycles using no additional 5-ethyl-2-methylpyridine. The yield of distilled product over 10 batches, amounted to 96.2% based on phosphorous trichloride charged. Table 1 shows the results of the reactions.

TABLE 1

PSCl₃ Formation via 5-ethyl-2-methylpyridine (MEP)

| Reaction | PCl₃ (Moles) | Sulfur (Moles) | MEP (Moles) | Reaction Time (HR/min) | Cumulative Yield % |
|---|---|---|---|---|---|
| Heel formation | 1.0 | 1.4 | 0.16 | 9 | 79.0 |
| Recycle #1 | 1.42 | 1.4 | — | 5 | 88.2 |
| Recycle #2 | 1.42 | 1.4 | — | 3 | 91.2 |
| Recycle #3 | 1.42 | 1.4 | — | 1 hr 40 min | 92.9 |
| Recycle #4 | 1.42 | 1.4 | — | 1 hr 17 min | 94.0 |
| Recycle #5 | 1.42 | 1.4 | — | 1 hr 25 min | 95.0 |
| Recycle #6 | 1.42 | 1.4 | — | 51 min | 95.4 |
| Recycle #7 | 1.42 | 1.4 | — | 51 min | 95.8 |
| Recycle #8 | 1.42 | 1.4 | — | 52 min | 96.4 |
| Recycle #9 | 1.42 | 1.4 | — | 48 min | 95.9 |
| Recycle #10 | 1.42 | 1.4 | — | 49 min | 96.2 |

Examples 2–6

In the following examples, essentially the same procedure and evaluation as described in Example 1 were employed except that the tertiary amine catalyst differs as noted below. The results are listed in the following Tables.
Heel formation for the thiophosphoryl chloride with other tertiary amines The tertiary amine (0.16 moles) catalyst will follow the preparation for heel formation followed by the subsequent batches.

| Charges | M.W. | A.I. % | Moles | Quantity |
|---|---|---|---|---|
| Heel Formation | | | | |
| Phosphorous Trichloride | 137.33 | 98 | 1.0 | 140.1 gm |
| Sulfur | 32.06 | 100 | 1.4 | 44.9 gm |
| Amine | a | b | 0.157 | $\dfrac{0.157 \times a}{b}$ |
| Subsequent Batches | | | | |
| Phosphorous Trichloride | 137.33 | 98 | 1.42 | 199.0 gm |
| Sulfur | 32.06 | 100 | 1.40 | 44.9 gm | a = M.W. of amine
b = Percent of Active Ingredient (AI), i.e., percent purity of amine

TABLE II

PSCl₃ Formation via 2,6-Lutidine

| Reaction | PCl₃ (Moles) | Sulfur (Moles) | 2,6-Lutidine (Moles) | Rxn time* (Hr/min) | Cumulative Yield % |
|---|---|---|---|---|---|
| Heel Formation | 1.0 | 1.4 | 0.16 | 14.0 | 67.0 |
| Recycle #1 | 1.42 | 1.4 | — | 9.5 | 70.0 |
| Recycle #2 | 1.42 | 1.4 | — | 7.5 | 78.1 |
| Recycle #3 | 1.42 | 1.4 | — | 5.0 | 82.8 |

*Reaction time does not include distillation.

TABLE III

PSCl₃ Formation via Tributylamine

| Reaction | PCl₃ (Moles) | Sulfur (Moles) | TBA (Moles) | Reaction Time* (HR/min) | Cumulative Yield % |
|---|---|---|---|---|---|
| Heel formation | 1.00 | 1.40 | 0.16 | 3 hr 44 min | 72.8 |
| Recycle #1 | 1.42 | 1.40 | — | 34 min | 83.5 |
| Recycle #2 | 1.42 | 1.40 | — | 20 min | 89.7 |
| Recycle #3 | 1.42 | 1.40 | — | 24 min | 91.6 |
| Recycle #4 | 1.42 | 1.40 | — | 24 min | 93.6 |
| Recycle #5 | 1.42 | 1,40 | — | 21 min | 94.9 |
| Recycle #6 | 1.42 | 1.40 | — | 47 min | 95.4 |
| Recycle #7 | 1.42 | 1.40 | — | 18 min | 96.0 |
| Recycle #8 | 1.42 | 1.40 | — | 35 min | 96.1 |
| Recycle #9 | 1.42 | 1.40 | — | 46 min | 96.1 |
| Recycle #10 | 1.42 | 1.40 | — | 23 min | 96.8 |

*reaction time does not include distillation.

TABLE IV

PSCl₃ Formation via N,N-Dimethylaniline

| Reaction | PCl₃ (Moles) | Sulfur (Moles) | DMA (Moles) | Reaction Time (Hr/min) | Cumulative Yield % |
|---|---|---|---|---|---|
| Heel formation | 1.00 | 1.40 | 0.160 | 19 hr 17 min | 53.0 |
| Recycle #1 | 1.42 | 1.40 | 0.016 | 21 hr 40 min | 63.6 |
| Recycle #2 | 1.42 | 1.40 | — | 16 hr | 40.0 |

*Reaction time does not include distillation.

TABLE V

PSCl₃ Formation via 1,8-Diazabicyclo[5.4.0.]undec-7-ene (DBU)

| Reaction | PCl₃ (Moles) | Sulfur (Moles) | DBU (Moles) | Reaction Time* (Hr/min) | Cumulative Yield % |
|---|---|---|---|---|---|
| Heel formation | 1.00 | 1.40 | 0.16 | 15 hr 6 min | 74.6 |
| Recycle #1 | 1.42 | 1.40 | — | 8 hr 29 min | 87.0 |
| Recycle #2 | 1.42 | 1.40 | — | 2 hr 10 min | 90.5 |

*Reaction time does not include distillation

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An process for preparing thiophosphoryl chloride by reacting phosphorous trichloride with sulfur in the presence of a catalyst, the improvement wherein the catalyst is a tertiary amine.

2. The process of claim 1 wherein the ratio of sulfur to phosphorous trichloride is from 1.5 to 1 to 1 to 1.

3. The process of claim 1 wherein the tertiary amine is selected from the group consisting of 5-ethyl-2-methylpyridine, 2-methylpyridine, 2,4-dimethylpyridine, 2,6-dimethylpyridine, 2,4,6-trimethylpyridine, tri-n-propylamine, tri-n-butylamine, tris-[2-(2-methoxyethoxy)ethyl] amine and 1,8-diazabicyclo[5.4.0]undec-7-ene.

4. The process of claim 3 wherein the catalyst is 5-ethyl-2-methylpyridine.

5. The process of claim 3 wherein the catalyst is tri-n-butylamine.

6. The process of claim 1 wherein the reaction is conducted at a temperature range of 110° C.–140° C.

7. The process of claim 1 wherein the reaction is conducted at a temperature of 115°–120° C.

8. The process of claim 1 wherein the reaction is conducted at normal atmospheric pressure.

9. The process of claim 1 further comprising the distilling thiophosphoryl chloride from the reaction product leaving behind the distillation heel containing the tertiary amine catalyst.

10. The process of claim 9 further comprising recycling the distillation heel to a subsequent batch.

11. The process of claim 9 further comprising a continuous recycling of the distillation heel to a reaction stage of the phosphorous trichloride and sulfur to produce thiophosphoryl chloride.

12. The process of claim 9 wherein the catalyst is 5-ethyl-2-methylpyridine.

13. The process of claim 9 wherein the catalyst is tri-n-butylamine.

14. The process of claim 11 wherein the catalyst is 5-ethyl-2-methylpyridine.

15. The process of claim 11 wherein the catalyst is tri-n-butylamine.

* * * * *